United States Patent [19]
Buhrer

[11] 3,903,422
[45] Sept. 2, 1975

[54] DIGITAL FLUOROMETER

[75] Inventor: Carl F. Buhrer, Framingham, Mass.

[73] Assignee: GTE Laboratories Incorporated, Waltham, Mass.

[22] Filed: June 14, 1974

[21] Appl. No.: 479,319

[52] U.S. Cl. .................. 250/461; 250/372; 250/578
[51] Int. Cl.² ........................................ G01N 21/38
[58] Field of Search ........... 250/372, 373, 461, 301, 250/205, 565, 578

[56] References Cited
UNITED STATES PATENTS

| | | | |
|---|---|---|---|
| 3,507,987 | 4/1970 | Van Den Bosch | 250/372 X |
| 3,562,795 | 2/1971 | Frenk | 250/372 |
| 3,617,744 | 11/1971 | Irish | 250/461 |

Primary Examiner—Archie R. Borchelt
Attorney, Agent, or Firm—Irving M. Kriegsman; Bernard L. Sweeney

[57] ABSTRACT

A digital fluorometer is described to measure the fluorescence of a specimen in an automatic manner. A photometric measuring bridge is formed with a cycled reference light source to balance the fluorescence from a specimen stimulated by a cycled ultra-violet light source. A digital control signal representative of the light unbalance is generated to vary the average intensity level from the reference source in a direction tending to establish the light balance. A pulse rate control is used to vary the average intensity from the reference light source for enhanced feedback control in obtaining an automatic indication of the magnitude of the specimen fluorescence.

26 Claims, 3 Drawing Figures

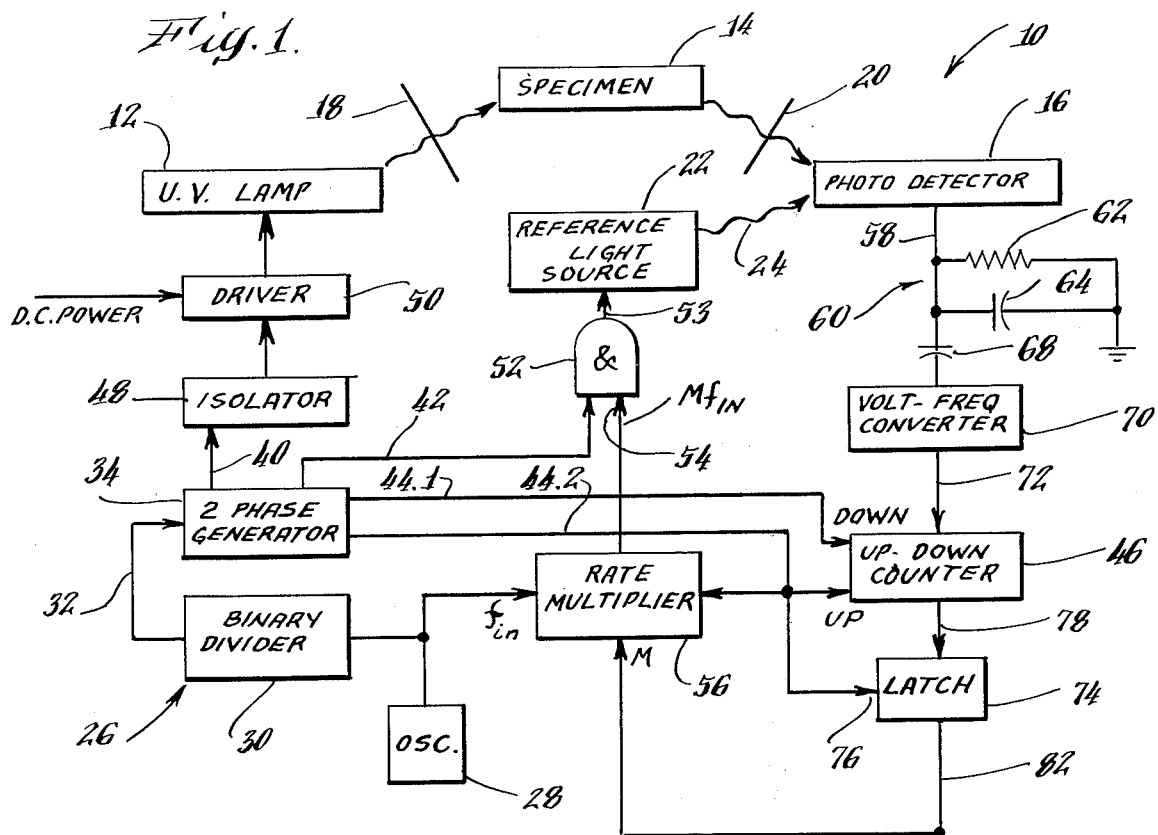

3,903,422

DIGITAL FLUOROMETER

This invention relates to an apparatus for measuring a stimulated response from a specimen. More specifically, this invention relates to an instrument for automatically measuring the fluorescence of a specimen.

BACKGROUND OF THE INVENTION

Fluorometers for measuring fluorescence from a specimen are well known in the art. Such instruments are useful to, for example, indicate the concentration of a compound in a substance or analyze a material for traces of certain ingredients. Publications describing fluorometric analysis techniques may be found in articles such as "Fluorescence Analysis" by George K. Turner, published in Med. Elect. News, 3, No. 2, pages 16 and 17 on January, 1963 and "Fluorescence Assay in Biology and Medicine" written by S. Undenfriend and published by Academic Press (1962).

A fluorometric instrument is produced by the G. K. Turner Associates of Palo Alto, California. The apparatus includes a source of ultraviolet light and a highly sensitive fluorescent light detector. The ultraviolet source is directed through an ultraviolet light passing filter onto a sample of a compound to be analyzed. The resulting fluorescence from the sample is passed through an ultraviolet rejection filter onto a photodetector from which an output signal is used to indicate the intensity of the fluorescence.

The Turner Associates instrument includes a light balancer by which a portion of the ultraviolet light source is directed along a different reference path, which includes a magnitude adjustable light reflector (a fluorescence indicator dial), to the same photodetector for comparison with the fluoroescence from the sample. A mechanical light interrupter is employed around the photodetector to alternately block and pass fluorescence from the sample and light along the reference path.

The output signal from the photodetector alternately represents the fluorescence from the specimen and the amplitude of the reference light from the ultraviolet light source. Since the portion of the signal related to the ultraviolet light source has an amplitude determined by the position of the dial, the establishment of signal balance provides a direct indication of the intensity of the fluorescence from the sample.

SUMMARY OF THE INVENTION

In a fluorometer instrument in accordance with the invention, a stimulated response such as the fluorescence of a material is automatically measured by varying the average intensity of a reference light source in a precisely controllable manner.

The output signal from a photodetector which is alternately exposed to the fluorescence of a specimen and the light from a reference source is processed to produce a digital control signal representative of a desired light balance level between the reference light and the specimen fluorescence. The digital control signal is used to vary the average intensity of the reference light source in a direction tending to establish the desired balancing level.

A cycle generator network is provided to alternately energize an ultraviolet specimen excitation source and the reference light source during an operating cycle. The photodetector output is passed through a voltage-to-frequency converter whose output pulses are counted to compare the count attributable to the reference light source. The accumulated net count, as sampled at a predetermined instant of each system cycle, approaches a steady value and is used to set the average intensity level of the reference light source during the cycle period the reference is energized. An indication of the amplitude of the sample fluorescence is obtained by displaying the magnitude of the output accumulated net count needed to establish the desired light balance between the reference light source and the sample fluorescence.

As described with reference to a preferred embodiment for a fluorometer in accordance with the invention, the average intensity of the reference light source is obtained by controlling the number of times that the reference light source is turned on to a fixed intensity level during the cycle portion when the reference source is energized by the cyle generator. The reference source is, therefore, operated with a variable repetition rate pulse source whose frequency or repetition rate is a function of the comparison count. In this manner, the reference light source provides a constant maximum calibrated light level into the photodetector while enabling an average intensity count to be formed to measure the fluorescence intensity from the specimen.

The automatic light balancing involves a feedback loop which is most sensitive to light variations occurring at the system cycle frequency and odd harmonics thereof. Since ambient light from artificial sources is modulated at the power line frequency and its harmonics, a careful choice of cycle frequency can advantageously minimize ambient light interference.

It is, therefore, an object of the invention to provide an apparatus to automatically measure the stimulated response from a specimen.

It is a further object of the invention to provide an automatically operated fluorometer. It is a further object of the invention to provide an automatic flourometer having a reduced sensitivity to ambient artifical light interference. It is still further an object of the invention to provide a convenient digital network for use in a fluorometer instrument to measure the fluorescence from a specimen.

BRIEF DESCRIPTION OF DRAWINGS

These and other objects and advantages of a fluorometer in accordance with the invention may be understood from the following description of a preferred embodiment described in conjunction with the drawings wherein:

FIG. 1 is a schematic block diagram of a digital fluorometer in accordance with the invention;

FIG. 2 is a schematic representation of the arrangement of components employed in a digital fluorometer in accordance with the invention; and FIG. 3 is a series of aligned waveforms generated in the digital fluorometer shown in FIG. 1.

DETAILED DESCRIPTION OF EMBODIMENT

With reference to FIG. 2, several components of a fluorometer instrument 10 are shown and include an ultraviolet light source 12 for stimulating fluorescence from a specimen 14 and a photodetector 16 oriented to respond to the fluorescence emitted by the stimulated specimen 14. An ultraviolet light passing filter 18 is employed between the specimen 14 and source 12 and an ultraviolet light rejecting filter 20 is located between the specimen 14 and the photodetector 16. These components are well known and generally employed in fluorometer instruments as used and described in the art.

In fact, as previously described herein with reference to the G. K. Turner Associates fluorometer, the photodetector 16 in the prior art is further optically coupled directly to the ultraviolet source 12 along a back-path to form an optical photometric bridge network comparable to the electronic bridge circuit. A control element is employed in the back-path to provide a control for establishing bridge balance and visual read-out of the fluorescence from sample 14.

In the fluorometer 10 in accordance with the invention, an optical photometric null network is formed with a second calibrated reference light source 22 whose average intensity may be varied to establish a balance. The reference source 22 is oriented to be incident upon the photodetector 16 as suggested by the light representing arrow 24.

Other components used in the fluorometer 10 such as the light sealing housing, the mounting of components and the like have been deleted for clarity since such arrangements are known in the art.

The excitation ultraviolet light source 12 is selected to be of a type which may be cycled on and off between a fixed, substantially constant, intensity level at a frequency from about ten Hz to about one thousand Hz. Preferably the excitation source 12 is a low power fluorescent lamp constructed with a phosphor whose emission spectrum is coincident with the excitation spectrum of the specimen 14 to be measured. The light decay time constant of the phosphor on the excitation lamp and of the fluorescent specimen itself are both short compared with the cycle time of the intensity modulation applied to the ultraviolet lamp 12. One convenient operation of the ultraviolet lamp provides a small sustaining current to permit easy restarting during cycling of the lamp. The lamp 12 further is selected to provide a substantially constant, precalibrated output intensity when turned on to stimulate the sample 14 with the same level of light.

The reference light source 22 is preferably selected to be of a type which can be cycled at a high variable rate to obtain a controllably average intensity level for balancing of the optical bridge. A light emitting diode, LED, whose output light produces an operative response provides a convenient light reference in the fluorometer 10.

A cycle generator 26 is used as shown in FIG. 1 to alternately energize the ultraviolet source 12 and reference source 22. The cycle generator 26 includes an oscillator or pulse generator 28 which operates in the neighborhood of about 700 kHz. A binary divider 30 of, for example 12 stages provides reduced frequency output on line 32 to a phase generator 34 to produce identical but phase-displaced pulses 36, 38 (see FIG. 3) on output lines 40, 42 respectively. In addition, phase generator 34 produces control signals on lines 44 having the same repetition frequency as pulses 36, 38 but respectively identify counting periods for an up-down counter 46.

Pulses 36 on line 40 are applied through an isolator network 48 to a lamp driver 50 to energize the ultraviolet lamp 12. Pulses 38 are applied to enable an AND gate 52 which allows energizing pulses on another AND gate input 54 from a rate multiplier network 56 to be applied to reference light source 22.

The output 58 from the photodetector 16 is applied to a load impedance network 60 formed of parallel coupled resistor 62 and capacitor 64. The time constant of network 60 is selected to smooth the output 58 from photodetector 16 with a time constant duration measured in comparison with the length of pulses 66 on output 58 as shown in FIG. 3. With a repetition frequency of 40 to 50 Hz for pulses 36 and 38 and a duty cycle of about 0.25 a time constant of a few milliseconds for network 60 can be used.

The voltage developed across network 60 is coupled through a large capacitance coupling capacitor 68 to a voltage-to-frequency converter 70 which develops an output signal on line 72 having a frequency controlled by the magnitude of the input voltage. The polarity is such that an increase in light intensity as received by detector 16 lowers the output frequency.

Up-down counter 46 counts the frequency of output 72 under control by the count control lines 44.1 and 44.2 from the phase generator 34. The counter 46 counts down when the source of specimen excitation lamp 12 is on and counts up when the reference light 22 is turned on. The resulting net count during each cycle is representative of an unbalance in the amount of light from the specimen 14 and the reference source 22.

This net count is sampled at the end of each cycle by a latch network 74, which stores as many of the most significant bits of the up-down counter 46 as needed for the desired control and display. The latch network has a clock input 76 which responds to that portion of the waveform on line 44.2 which signifies the end 78 of a cycle. Hence, at that time, the net count in up-down counter 46 is transferred and stored along line 78. The output 82 from latch network 74 is coupled to the multiplier input, $m$, of rate multiplier 56.

A visual indication of the fluorescence from specimen 14 is obtained by applying the output 82 of the latch 74 to a binary-to-binary coded decimal converter whose output signals actuate a three digit decimal display 90.

In the operation of the fluorometer instrument 10, the sample excitation light 12 and reference light source 22 are alternately energized for preselected time periods as determined by the duration of pulses 36, 38. Preferably these pulses are of equal duration with each having a duty cycle of about 0.25. These values may be varied for the pulses to compensate, for example, for intensity variations due to age, spectral emissions and the like.

As the ultraviolet lamp is energized, a fluorescence pulse 66.1 is developed into the converter 70 and the resulting frequency count permitted to drive the up-down counter downwardly as long as pulses from the converter 70 arrive.

At the end of the excitation part of the cycle, line 42 goes active and AND gate 52 enabled to pass pulses from rate multiplier 56 to energize the reference light source 22. This causes a plurality of pulse responses from photodetector 16 whose rapidly varying output is smoothed by network 60 and then converted to a frequency signal by network 70. At this time, the up-down counter has been placed in an up-counting state by line 44.2 and proceeds to do so for the balance of the cycle.

The above process of down counting and up counting continues during each cycle and eventually establishes an accumulated net count representative of the average intensity level needed from reference light source 22 to balance the fluorescence from specimen 14. Thus, initially the count in counter 46 at the end of a cycle is primarily attributable to the fluorescence. This count, after transfer at the end of each cycle to latch 74, is of such magnitude that the multiplier input, $m$, to the rate multiplier 56 results in a correspondingly balancing drive to reference light source 22. Since, the up-down counter 46 is not reset after each cycle, the accumulated net count becomes representative of the average intensity of the fluorescence.

Each cycle, however, may produce a change in the accumulated net count in the up-down counter 46. Such change represents the difference in the average light intensity between the specimen fluorescence and the reference source as measured during the respective down and up counting portions of the cycle. The changed count is stored in latch network 74 and begins to change the drive to rate multiplier 56 in a direction which will reduce the net count change per cycle.

For example, if the change in the count is positive, the average light intensity from the reference light source is interpreted as being below that of the fluorescence from the sample. Hence, the output from rate multiplier 56 increases to produce a higher average intensity from reference source 22.

Control over the average intensity of reference source 22 can be achieved in several manners. A first involves the application of a constant amplitude energizing pulse whose duration results in a corresponding energization of source 22. A preferred control of source 22 contemplates energizing source 22 with a series of pulses such as 39 during the cycle enable pulse 42 (see FIG. 2) to distribute the light from the reference source as evenly as possible across the time duration of the enabling pulse on line 42.

Thus the digital count established on the output of the latch 74 is used to produce pulses in the following manner. For the most significant binary digit on line 82, pulses are to be produced at the rate of $2n-1$, where $n$ represents the successive pulses applied to the $f_{in}$ input line to rate multiplier. The next most significant digit produces pulses at the rate of $4n-2$ and the third most significant bit at the rate of $8n-4$. In this way the average intensity from the reference or compensating light source 22 is evenly distributed over the entire period determined by the enable pulse on line 42.

A convenient circuit for obtaining the even distribution of light energizing pulses is a rate multiplier which has a multiplier input, $m$, supplied by latch 74 and a pulse frequency input $f_{in}$ from oscillator 28. A network 56 suitable for such pulse distribution may be, for example, the synchronous binary rate multipliers, models Ser. No. 5497 as marketed by Texas Instruments Inc. of Dallas, Texas in a sales brochure dated December, 1972. As described with reference to these models, a binary divider and divided output are provided. Hence, the functions produced by network 30 can be performed by these network models.

Having thus described a digital fluorometer its advantages can be appreciated. The apparatus may be conveniently used to measure stimulated emissions from a specimen. Fluctutations due to line frequency variations in artificial ambient light may be reduced by selecting the operating frequency from the cycle generator 26. The pulse rate applied to the reference light source 22 can be made sufficiently high to achieve a large dynamic range for the rate multiplier 56.

What is claimed is:

1. An apparatus for measuring a characteristic parameter of the radiation stimulated from a specimen by an excitation source of energy comprising
    means for producing a variable reference source of energy selected for comparative measuring of the characteristic parameter of the stimulated radiation from the specimen;
    detecting means responsive to the radiation stimulated from the specimen and the reference source of energy for producing a detection signal alternately representative thereof;
    means for producing a pulse count signal representative of the detection signal; and
    means responsive to the pulse count signal to vary said reference source of energy in a direction to establish said pulse count signal as a measure of the characteristic parameter of the stimulated specimen radiation.

2. The apparatus for measuring the characteristic parameter of the stimulated specimen radiation as claimed in claim 1 and further including
    energy control means for cyclically and alternately controlling said excitation source of energy and the reference source of energy to enable said detection signal to be alternately representative of the stimulated radiation emission from the specimen and the reference source of energy.

3. The apparatus for measuring the characteristic parameter of the stimulated specimen radiation as claimed in claim 2 wherein said pulse count signal producing means further includes
    means for producing a frequency signal whose frequency corresponds to the characteristic parameter represented by the detection signal; and
    counting means responsive to the frequency signal and actuated by the energy control means for producing said pulse count signal.

4. The apparatus for measuring the characteristic parameter of the stimulated specimen radiation as claimed in claim 3 wherein said counting means includes
    an up-down counter responsive to the frequency signal and coupled to the energy control means to alternately increase and decrease the count in the counter in correspondence with the occurrence of alternating stimulated specimen radiation emission and reference source energy.

5. The apparatus for measuring the characteristic parameter of stimulated specimen radiation as claimed in claim 4 wherein said reference source varying means further includes
    a pulse generator;
    a rate multiplier having a pulse input responsive to the pulse generator and a multiplier input effectively responsive to the pulse count generated in the up-down counter to produce an output rate of pulses proportional to the pulse count; and
    means enabled by the energy control means for applying said output pulse rate from the rate multiplier to correspondingly energize the reference source of energy.

6. The apparatus for measuring the characteristic parameter of the stimulated specimen radiation as claimed in claim 4 wherein the reference source varying means further includes a latch network operatively coupled between the rate multiplier and the up-down counter to store its count after alternate energization of the excitation source of energy and reference source of energy.

7. The apparatus for measuring the characteristic parameter of the stimulated specimen radiation as claimed in claim 2 and further including means responsive to the pulse count signal for displaying an indication of the measured characteristic parameter.

8. A fluorometer for measuring the fluorescence stimulated from a specimen by an excitation source of radiation with the fluorescence from the specimen being detected by a photodetector comprising a reference light source directed at the photodetector;

means for alternately exposing the photodetector to the fluorescence from the specimen and the light from the reference source;

means for converting the output of the photodetector to a frequency signal whose frequency is representative of the magnitude of the photodetector output;

means controlled by the alternate exposing means and responsive to the frequency signal for producing a pulse count signal representative of the amount of light from the reference source needed to balance the light from the fluorescing specimen; and means responsive to the pulse count signal for altering the amount of light from the reference source to establish said light balance.

9. The fluorometer as claimed in claim 8 wherein the alternately exposing means further includes means for generating light source enabling signals occurring at the same frequency and with separate phase;

means responsive to the light source enabling signals to respectively energize the excitation source and the reference source.

10. The fluorometer as claimed in claim 9 wherein the means for altering the amount of light from the reference source further includes means for varying the average intensity level of the reference source during the light source enable signal applied thereto for energization.

11. The fluorometer as claimed in claim 10 wherein the average intensity varying means further includes means controlled by the pulse count for producing a train of pulses whose repetition rate during the time of the reference souce energization is selected to determine the average intensity level.

12. The fluorometer as claimed in claim 11 wherein said pulse train producing means includes a digital rate multiplier network having a pulse rate input, a multiplier input and a reduced multiplied pulse rate output, with the multiplier input effectively coupled to the pulse count signal.

13. The fluorometer as claimed in claim 12 wherein the light source enabling signal generating means further includes an oscillator and a counter responsive to the output from the oscillator to generate a reduced output frequency.

14. The fluorometer as claimed in claim 13 wherein the rate multiplier pulse rate input is selectively responsive to the oscillator or reduced output frequency thereof.

15. A fluorometer for measuring the fluorescence stimulated from a specimen by an excitation source of radiation with the fluorescence from the specimen being detected by a photodetector comprising an intensity variable reference light source directed at the photodetector, said excitation source and the reference light source being coupled to measure the amount of fluorescence from the specimen;

means for alternately energizing the excitation light source and the reference light source during an operating cycle with the respective source energizations during each cycle selected to obtain an indication of the magnitude of the fluorescence from the specimen;

means reponsive to the output of the photodetector for producing a digital control signal indicative of the difference in average light intensity between the fluorescence from the specimen and the light from the reference source during each cycle of energization; and means responsive to the digital control signal for varying the average intensity of the reference light source in a direction to establish a light balance between the fluorescence from the specimen and the reference light source.

16. The fluorometer as claimed in claim 15 wherein the means for varying the average intensity of the reference light source further includes means responsive to the digital control signal for producing a train of energizing pulses at a repetition rate selected to establish the desired average light intensity from the reference light source, said train of energizing pulses being each effective to drive the reference light source for a pulse duration period to a preselected calibrated maximum level.

17. The fluorometer as claimed in claim 16 wherein the train of pulses producing means includes a rate multiplier network;

means for generating a plurality of rate pulses selected to be modified in pulse repetition rate and applying the rate pulses to the rate multiplier; and means for applying the digital control signal to the rate multiplier network to determine the output pulse rate therefrom.

18. The fluorometer as claimed in claim 17 wherein the means for applying the digital control signal further includes a latch network for storing the digital control signal during each cycle and applying the latch-stored digital control signal to the rate multiplier network.

19. The fluorometer as claimed in claim 18 wherein the digital control signal producing means further includes means for smoothing the output of the photodetector;

means for producing a frequency signal whose frequency is representative of the magnitude of the smoothed photodetector output; and an up-down counter reponsive to the frequency signal and controlled by the alternately energizing means to form said digital control signal.

20. The fluorometer as claimed in claim 21 and further including means responsive to the digital control signal to generate an indication of the intensity of the fluorescence when the photometric system is balanced.

21. A fluorometer for measuring the fluorescence stimulated from a specimen by an excitation source of light radiation with the fluorescence from the specimen being detected by a photodetector comprising an intensity variable reference light source directed at the photodetector, said excitation source and the reference light source being coupled to measure the amount of fluorescence from the specimen;

a cycle generator coupled to alternately energize the excitation source and the reference light source;

means for rapidly pulsing the reference light source between a low level and a high calibrated maximum level in correspondence with a pulse rate selected to establish a photometric balance over a cycle determined by the cycle generator;

means responsive to the photodetector output for comparing during any one cycle the photodetector output attributable to the excitation source and the photodetector output attibutable to the reference light source and generating a digital control signal indicative thereof; and means for coupling the digital control signal to the rapidly pulsing means to control the rate thereof in accordance with the digital control signal and establish balance.

22. The fluorometer as claimed in claim 21 wherein the cycle generator includes an oscillator and a binary divider responsive to the oscillator to provide a cycle signal determinative of the cycle rate for energizing of the excitation source and the reference light source, and a phase generator to provide phase-separated pulses for time separated energization of the excitation source and the reference light source.

23. The fluorometer as claimed in claim 22 wherein the respective duty cycles of the phase-separator pulses are substantially the same.

24. The fluorometer as claimed in claim 21 wherein the rapidly pulsing means further includes a rate multiplier network having a rate input, a multiplier input effectively coupled to the digital control signal and a reduced output pulse rate; and means for selectively coupling the cycle generator to the rate multiplier to establish a desired operating range for the balancing of the sample fluorescence with the rapidly pulsed reference light source.

25. The fluorometer as claimed in claim 24 wherein the comparing means further includes a latch network coupled to store the digital control signal.

26. The fluorometer as claimed in claim 25 wherein the reference light source is a light emitting semiconductor diode.

* * * * *